Patented June 27, 1939

2,163,584

UNITED STATES PATENT OFFICE 2,163,584

PREPARATION OF POLYAMIDES

Wallace H. Carothers and George D. Graves, Wilmington, Del., assignors to E. I. du Pont de Nemours & Company, Wilmington, Del., a corporation of Delaware No Drawing. Application December 1, 1936, Serial No. 113,723

17 Claims. (Cl. 260—78)

This invention relates to polyamides and more particularly to an improved process for the preparation of fiber-forming polyamides from diamines and dicarboxylic acids.

In the application of W. H. Carothers filed July 1, 1936, Serial Number 88,491 now Patent No. 2,130,947, there are disclosed new fiber-forming materials derived from diamines whose amino nitrogens each carries at least one hydrogen atom and dicarboxylic acids. One of the methods described in the mentioned application consists in first forming the diamine-dibasic acid salt by crystallization methods and then heating the preformed salt under polymerizing conditions.

An object of this invention is to provide a simple, convenient, and improved method for the preparation of fiber-forming polyamides from diamines and dicarboxylic acids. Another object is to prepare fiber-forming polyamides with predetermined properties from diamines and dicarboxylic acids without isolating and purifying the intermediate diamine-dibasic acid salts. Other objects will appear hereinafter.

These objects are accomplished by mixing in an aqueous medium a diamine, whose amino nitrogens each carries at least one hydrogen atom, preferably a diamine of formula $NH_2CH_2RCH_2NH_2$, and a dicarboxylic acid, preferably an acid of the formula $HOOCCH_2R'CH_2COOH$, in such proportions that the pH of the mixture is at the inflection point, removing the aqueous medium by distillation, and heating the residue under polymerizing conditions, preferably until a fiber-forming product is obtained, R and R' in said formulae representing divalent hydrocarbon radicals free from olefinic and acetylenic unsaturation and R having a chain length of at least two carbon atoms.

As described in the above mentioned application and in the applications referred to therein, the preparation of "superpolyamides", i. e., polyamides capable of yielding useful and pliable fibers, from diamines and dicarboxylic acids requires the use of substantially chemically equivalent amounts of diamine and dicarboxylic acid. This means that an exact knowledge of the purity of the diamine and dicarboxylic acid is necessary to admix them in the proper proportions for superpolyamide formation. Even when the purity of the reactants is known, it is a difficult matter to admix them in proper proportions since the diamine is very susceptible to change, particularly in the presence of oxygen, and is hygroscopic. While a superpolyamide can be prepared in this manner, it is almost impossible to reproduce results, i. e., obtain products having the same properties in successive preparations using supposedly the same reactants and reaction conditions. A method for overcoming this difficulty has been described in the application referred to, which consists in first reacting the diamine and dicarboxylic acid under mild conditions to produce the diamine-dicarboxylic acid salt, isolating this salt, and then using the pure salt in the preparation of the superpolyamide. Since the salt is quite stable, this process works satisfactorily and makes it possible to reproduce results quite easily. However, this process requires an additional step, namely, the crystallization of the diamine-dibasic acid salt and in some cases its further purification by recrystallization, and is therefore economically disadvantageous.

It has now been found that equivalency of diamine and dicarboxylic acid can be obtained without the necessity of isolating the diamine-dibasic acid salt by crystallization and without the necessity of analyzing each reactant individually. The method for accomplishing this, which comprises the first step in the process of the present invention, is based on the observation that when a sample of a diamine or a dicarboxylic acid is placed in water and the other component is added portionwise, there is an inflection in the pH curve (graph of pH versus quantity of reagent added) at the point at which the two reactants are present in chemically equivalent amounts. This inflection or equivalency point is easily determined by electrometric measurements of the hydrogen ion concentration, preferably carried out with a pH meter using glass and calomel electrodes. The values for the pH at the inflection point are usually between 6.6 and 7.8, when the electrometric titration is made at a concentration of approximately 0.4 molar in carbon dioxide-free water. On the basis of a single analysis of a test portion of the reactants in this manner, it is possible to determine the strength of the diamine in terms of the acid and then mix them in the proper proportions for superpolyamide formation. Instead of analyzing a test portion in this fashion, however, it has been found advantageous to dissolve approximately the total quantity of diamine and dicarboxylic acid needed for the preparation of a given quantity of polyamide in water or other suitable aqueous medium, e. g., a water-alcohol mixture, and then with the aid of a pH meter bring the mixture to exact equivalency by adding a sufficient quantity of the reactant present in deficient amount. The resultant solution, which contains chemically equivalent amounts of the reactants, is then charged into the reaction vessel to be used in the polyamide-forming reaction. If desired, modifying agents, e. g., viscosity stabilization agents, plasticizers, delusterants, pigments, dyes, and the like may be added. The water or aqueous diluent used is then carefully distilled off and the residue is heated to the temperature required for polyamide formation. This is usually in the neighborhood of 180 to 300° C., and preferably 200 to 290° C. The process will now be described in somewhat greater detail.

The first step in the process of this invention is the preparation of the solution containing the diamine and dicarboxylic acid in equimolecular amount. Inasmuch as this equivalency point is determined by measuring the pH of the solution, it is necessary to select a solvent which will bring about ionization and preferably a solvent which can be readily removed by distillation, since it is usually desirable to conduct the subsequent polymerization reaction in the absence of a solvent. Water and water-alcohol mixtures fulfill these requirements and are the preferred solvents. In order to minimize the time and energy spent in removing the solvent prior to the subsequent polymerization reaction, it is desirable to use only enough solvent to dissolve the reactants. The quantity of solvent required can generally be reduced to a minimum by keeping the solution at moderately elevated temperature, e. g., 75 to 125° C. As already indicated, the solution is prepared by dissolving the diamine and dicarboxylic acid in the solvent, measuring the pH, and adding a sufficient amount of the reactant present in deficient amount to bring the mixture to the inflection or equivalency point. The inflection point is that point at which addition of either amine or acid causes a sharp inflection in the pH curve, i. e., the curve obtained by plotting the pH value of the solution against the quantity of either reagent used. If desired, the value of the pH at the inflection point can be determined in advance for any pair of reactants by placing a sample of either reactant in water and adding the other component portionwise until there is a sharp inflection in the curve. Thus, if the diamine were added to a solution of the dicarboxylic acid, one would plot the pH of the solution versus the quantity of diamine added. Addition of either amine or acid at the inflection point would cause a marked change in the pH. The value of the pH at the inflection point can be determined readily with the aid of a Beckman pH meter with an accuracy of 0.02 to 0.03 pH unit. The pH value at the inflection point differs somewhat for different reactants but, as already indicated, is usually between 6.6 and 7.8. It also varies somewhat with the concentration of the solution. Typical values for various pairs of reactants in 0.4 molar solution in water are presented below in Table I.

TABLE I

*Inflection point for typical diamine-dicarboxylic acid mixtures*

| Diamine | Dicarboxylic acid | pH value (±0.03) |
|---|---|---|
| Pentamethylene | Sebacic | 7.50 |
| Hexamethylene | Adipic | 7.62 |
| Nonamethylene | Adipic | 7.63 |
| Nonamethylene | Sebacic | 7.63 |
| Decamethylene | Adipic | 7.72 |
| Decamethylene | p-Phenylene diacetic | 7.52 |
| p-Xylylene | p-Phenylene diacetic | 6.68 |
| p-Xylylene | Sebacic | 7.03 |

The solution containing equimolecular amounts of diamine and dicarboxylic acid prepared as described above is next transferred into the reaction vessel or autoclave to be used in the polymerization operation. During the transfer of the solution, the temperature should be kept sufficiently high to prevent any precipitation. The solution can be readily transferred to the reaction vessel by any suitable means but the use of a pump for this purpose is usually most desirable. It is within the scope of this invention, however, to prepare the diamine-dibasic carboxylic acid solution directly in the reaction vessel to be used in preparing the polymer.

The next step in the process is to remove the volatile solvent which will usually be water or water-alcohol mixture. This is done by providing the reaction vessel or autoclave with an efficient condenser which will permit the removal of the solvent but not of the reactants. As the solvent is removed, the reactants separate from the solution usually in the form of a solid at the temperature employed for this purpose. The removal of the solvent is generally effected at a temperature below 160° C. Preferably this operation is carried out at atmospheric or superatmospheric pressure.

After the solvent has been removed, the residue is heated to a more elevated temperature to bring about the formation of the superpolyamide. The temperature employed in this operation is between 180 and 300° C., and usually between 200 and 290° C. As indicated in the before mentioned co-pending applications, the superpolymeric stage is not generally reached until the polyamide has an intrinsic viscosity of at least 0.4, where intrinsic viscosity is defined as $$\frac{\log_e \eta_r}{C}$$

in which $\eta_r$ is the viscosity of a dilute m-cresol solution of the polymer divided by the viscosity of m-cresol in the same units and at the same temperature, and C is the concentration in grams of polymer per 100 cc. of solution.

The polymerization reaction must be carried out in the absence of oxygen if light-colored products are to be obtained. This can be accomplished, as shown in the subsequent example, by effecting the reaction in the presence of oxygen-free nitrogen. The reaction may be carried out in glass vessels, but it is usually desirable in large scale operations to use reaction vessels constructed of or lined with silver, tantalum, chromium, or chromium-containing ferrous metals, as described in the application of G. D. Graves filed October 13, 1936, Serial Number 105,425.

This invention is especially useful in the preparation of viscosity stable superpolyamides, i. e., superpolyamides whose intrinsic viscosity is not altered appreciably by further heating, a property which is desirable if the product is to be spun into fibers from melt. As indicated in application Serial Number 74,811, filed April 16, 1936, one method for preparing such polymers consists in preparing them in the presence of an excess of diamine, dicarboxylic acid, or amide-forming derivative of a dibasic carboxylic acid. Another suitable method, described in the application of W. R. Peterson, Serial Number 83,809, filed June 5, 1936, consists in carrying out the polymerization in the presence of a small amount of a monomeric carboxylic acid or amide-forming derivative thereof, or in the presence of a small amount of a monofunctional nitrogenous base or reagent capable of functioning as such under the conditions of the polymerization reaction. Since the ultimate viscosity of the polymer is dependent upon the quantity of stabilizer added and upon the ratio of diamine to dibasic acid, an exact knowledge of the diamine-dibasic acid ratio is necessary in order to know how much viscosity stabilizer should be added to obtain a polyamide of a given intrinsic viscosity. The process of the present invention is especially useful in this connection, since it permits the formation of mixtures containing equimolecular amounts of diamine and dibasic acid to which the necessary quantity of viscosity stabilizer required for the preparation of viscosity stable polymers of known properties can then be added. The quantity of viscosity stabilization agent usually employed ranges from 0.1 to 5.0 molar per cent based on the amount of diamine employed.

This invention is described more specifically in the following example, in which parts are given by weight:

EXAMPLE I

Approximately 292 parts of adipic acid was added to a solution of 232 parts of hexamethylenediamine in 300 parts of water. This resulted in the evolution of heat. Electrometric measurement of the pH of this solution indicated that additional diamine would be required to reach the equivalency point. Hexamethylenediamine was therefore added portionwise until the pH of the solution was at the inflection point. This required 1.5 parts of the diamine. The resultant mixture, together with 4.72 parts of hexamethylene diammonium acetate (viscosity stabilization agent) was then charged into an autoclave constructed of 18:8 stainless steel (i. e., a chromium-containing ferrous metal containing 18 parts chromium, 8 parts nickel, less than 0.2% carbon, and approximately 74 parts of iron). Air was replaced from the autoclave by evacuation followed by introduction of oxygen-free nitrogen. The autoclave, which was provided with an efficient condenser, was then heated to 150° C. at atmospheric pressure to distill off the water. Only a trace of diamine was lost in this operation. After the removal of the water, a pressure of 100 pounds was applied by means of oxygen-free nitrogen and the temperature was raised to 288° C. during one and one-half hours. When the autoclave had reached this temperature, the pressure was slowly decreased to atmospheric and heating and stirring were continued for 15 minutes. The resultant superpolymer, polyhexamethylene adipamide, had an intrinsic viscosity of 0.76 and could be spun readily from melt under oxygen-free conditions into fibers having excellent qualities.

The foregoing example describes the preparation of a superpolymer from hexamethylenediamine and adipic acid. Although this invention is applicable to the preparation of all types of polyamides from diamines and dicarboxylic acids, including those which are fiber-forming, as well as those which are resinous and non-fiber-forming, it is especially applicable to the preparation of the fiber-forming products, since this type of polymer requires more nearly equivalent amounts of diamine and dibasic acid in order to produce a product of sufficiently high molecular weight to yield fibers, films, sheets, and the like. Very useful reactants for the preparation of superpolyamides according to the present invention are diamines of formula $NH_2CH_2RCH_2NH_2$ and dicarboxylic acids of formula $HOOCCH_2R'CH_2COOH$, in which R and R' are divalent hydrocarbon radicals free from non-benzenoid unsaturation (i. e., olefinic and acetylenic unsaturation) and in which R has a chain length of at least two carbon atoms. Especially useful reactants which fall within this group are those in which R is $(CH_2)_x$ and R' is $(CH_2)_y$, in which $x$ and $y$ are integers and $x$ is at least two. As examples of superpolyamides which can be derived from reactants of these types by the method of the present invention may be mentioned polytetramethylene adipamide; polytetramethylene suberamide, polytetramethylene sebacamide, polypentamethylene adipamide, polypentamethylene sebacamide, polyhexamethylene adipamide, polyhexamethylene sebacamide, polyoctamethylene adipamide, polydecamethylene adipamide, polydecamethylene p-phenylene diacetamide, and poly-p-xylylene sebacamide.

In the specific example cited equivalency of diamine and dicarboxylic acid is obtained in water solution with the aid of electrometric titration. While water is the preferred solvent for this purpose, aqueous solutions of various alcohols, such as methanol, ethanol, and isopropanol may be used. Other water soluble organic liquids which are inert toward the polyamide forming reactants can also be used in conjunction with water. As examples of such compounds might be mentioned acetone and dioxan. As already indicated, it is desirable to select a solvent which can be readily removed by distillation prior to the polymerization operation. It is within the scope of this invention, however, to add to the aqueous diamine-dicarboxylic acid solution solvents, plasticizers, e. g., o-hydroxydiphenyl and p-toluene sulfonethylamide; delusterants, e. g., titanium dioxide and the dinaphthyl ether of ethylene glycol; dyes; fillers; and other types of modifying agents which can be left in the mixture during the polyamide-forming reaction. Thus, it is possible to add solvents, such as phenol, cresol, and xylenol. In fact, it is possible to bring about equivalency of diamine and dicarboxylic acid in a phenolic solvent with the aid of electrometric titrations and carry out the reaction in the presence of the solvent.

The process of this invention is useful also in the preparation of interpolymers, e. g., from a mixture of diamines with one or more dicarboxylic acids. Thus, a solution containing equimolecular amounts of hexamethylenediamine and adipic acid (pH 7.6) and a solution of equimolecular amounts of decamethylenediamine and adipic acid (pH 7.6) may be mixed and converted into a superpolyamide by the method described in Example I. The mention of a diamine and of a dibasic carboxylic acid in the claims refers, therefore, either to one diamine and one dibasic carboxylic acid, or to one or more members of each of these classes of compounds. It is also possible to use polymerizable amino acids or their amide forming derivatives in the preparation of the interpolymers.

This invention provides a simple and economical method for the preparation of superpolymers directly from a diamine and dibasic carboxylic acid without the isolation and purification of the intermediate salt. The process eliminates the necessity of analyzing each reactant individually and gives reproducible results even with reactants which have not been carefully purified, providing the impurity does not interfere with the diamine-dicarboxylic acid titration. The process is well adapted to large scale production.

As many apparently widely different embodiments of this invention may be made without departing from the spirit and scope thereof, it is to be understood that we do not limit ourselves to the specific embodiments thereof except as defined in the appended claims.

We claim:

1. A process for making polyamides which comprises preparing in an aqueous medium a solution of ingredients in which substantially the sole reactants consist of a diamine whose sole titratable groups are the amino groups and whose amino nitrogens each carries at least one hydrogen atom, and a dibasic dicarboxylic acid in equimolecular proportions, as indicated by titration, distilling off the aqueous medium, and heating the residue under polymerizing conditions.

2. A process for making polyamides which comprises forming in an aqueous medium a solution of ingredients in which substantially the sole reactants consist of a diamine whose sole titratable groups are the amino groups and whose amino nitrogens each carries at least one hydrogen atom, and a dibasic dicarboxylic acid in such proportions that the pH of the solution is between 6.6 and 7.8, distilling off the aqueous medium, and heating the residue under polymerizing conditions.

3. A process for making polyamides which comprises forming in an aqueous medium a solution of ingredients in which substantially the sole reactants consist of a diamine whose sole titratable groups are the amino groups and whose amino nitrogens each carries at least one hydrogen atom, and a dibasic dicarboxylic acid in such proportions that the pH of the solution is at the inflection point, distilling off the aqueous medium, and heating the residue under polymerizing conditions.

4. A process which comprises forming in aqueous medium a solution of ingredients in which substantially the sole reactants consist of a diamine whose sole titratable groups are the amino groups and whose amino nitrogens each carries at least one hydrogen atom, and a dibasic dicarboxylic acid, one of said reactants being present in excess, adding the reactant present in deficient amount until the pH of the solution, as determined by electrometric measurements of the hydrogen ion concentration, shows the reactants to be present in equimolecular proportions, distilling off the aqueous medium, and polymerizing the residue by heat treatment.

5. A process which comprises forming in aqueous medium a solution of ingredients in which substantially the sole reactants consist of a diamine whose sole titratable groups are the amino groups and whose amino nitrogens each carries at least one hydrogen atom, and a dibasic dicarboxylic acid, one of said reactants being present in excess, adding the reactant present in deficient amount until the pH of the solution, as determined by electrometric measurements of the hydrogen ion concentration, shows the reactants to be present in equimolecular proportions, transferring the solution to a reaction vessel, distilling off the aqueous medium in said vessel, and heating the residue in said vessel at a temperature of 180°–300° C. until polymerized.

6. The process of claim 5 in which the polymerization is continued until a polymer is formed which is capable of yielding useful and pliable fibers, and in which the diamine has the formula $NH_2CH_2RCH_2NH_2$ and the dicarboxylic acid has the formula $HOOCCH_2R'CH_2COOH$, wherein R and R' are divalent hydrocarbon radicals free from olefinic and acetylenic unsaturation and in which R has a chain length of at least two carbon atoms.

7. The process of claim 5 in which said diamine has the formula $NH_2CH_2RCH_2NH_2$ and said dicarboxylic acid has the formula $HOOCCH_2R'CH_2COOH$ wherein R is $(CH_2)_x$ and R' is $(CH_2)_y$, wherein $x$ and $y$ are integers and $x$ is at least two.

8. A process for making fiber-forming polyamides which comprises forming in an aqueous medium a solution of equimolecular amounts of ingredients in which substantially the sole reactants consist of a diamine of formula $NH_2CH_2RCH_2NH_2$ and a dicarboxylic acid of formula $HOOCCH_2R'CH_2COOH$ by mixing said reactants in such proportions that the pH of the solution is at the inflection point, distilling off the aqueous medium, and polymerizing the residue by heat treatment, R and R' in said formulae being divalent hydrocarbon radicals free from olefinic and acetylenic unsaturation and R having a chain length of at least two carbon atoms.

9. The process of claim 8 in which the aqueous medium consists solely of water.

10. The process of claim 8 in which the aqueous medium consists of water and an alcohol.

11. The process of claim 8 in which the polymerization is effected between 180° and 300° C.

12. The process of claim 8 in which R is $(CH_2)_x$ and R' is $(CH_2)_y$, wherein $x$ and $y$ are integers and $x$ is at least two.

13. The process of claim 8 in which a viscosity stabilization agent is added to the reaction mixture prior to polymerization.

14. The process of claim 8 in which 0.1 to 5.0 molar per cent, based on the quantity of $NH_2CH_2RCH_2NH_2$ employed, of an amide-forming compound of the class consisting of dicarboxylic acids, amide-forming derivatives of dibasic carboxylic acids, monocarboxylic acids, amide-forming derivatives of monocarboxylic acids, diamines, and monofunctional nitrogenous bases, is added to the equimolecular mixture of $NH_2CH_2RCH_2NH_2$ and $HOOCCH_2R'CH_2COOH$ prior to polymerization.

15. A process for making polyamides which comprises forming in an aqueous medium a solution of ingredients in which the titratable reactants consist substantially solely of a diamine, whose sole titratable groups are the amino groups and whose amino nitrogens each carries at least one hydrogen atom, and a dibasic dicarboxylic acid in such proportions that the pH of the solution is at the inflection point, distilling off the aqueous medium, and heating the residue under polymerizing conditions until the product has an intrinsic viscosity of at least 0.4.

16. A process for making polyamides which comprises forming in an aqueous medium a solution of ingredients in which the titratable reactants consisting substantially solely of a diamine of formula $NH_2CH_2RCH_2NH_2$ and a dicarboxylic acid of formula $HOOCCH_2R'CH_2COOH$ in such proportions that the pH of the solution is at the inflection point, distilling off the aqueous medium, and polymerizing the residue by heat treatment until the product has an intrinsic viscosity of at least 0.4, R and R' in said formulae being divalent hydrocarbon radicals free from olefinic and acetylenic unsaturation and R having a chain length of at least two carbon atoms.

17. The process set forth in claim 8 in which said diamine is hexamethylene diamine and in which said dicarboxylic acid is adipic acid.

WALLACE H. CAROTHERS.
GEORGE D. GRAVES.